May 11, 1926. 1,584,632

S. M. MERWARTH ET AL

PLANT FORCING DEVICE

Filed July 19, 1924

Inventor

Samuel M. Merwarth
Albert Merwarth
AND Sylvester C. Merwarth

By Wm. Fletcher + Co. Attorneys

Patented May 11, 1926.

1,584,632

UNITED STATES PATENT OFFICE.

SAMUEL M. MERWARTH, ALBERT MERWARTH, AND SYLVESTER C. MERWARTH, OF EASTON, PENNSYLVANIA.

PLANT-FORCING DEVICE.

Application filed July 19, 1924. Serial No. 726,961.

This invention relates to an improved form of plant forcing device, and more particularly to a device which will serve to protect a small slip, and to force the same so that it will grow more rapidly than were the same planted in the open.

An object of the invention is to provide a cone shaped plant forcing device, which will be composed of a wire mesh, which has its interstices filled with celo glass, which is a composition of guncotton in the nature of collodion, which will quickly dry in the air and leave the said interstices filled with a thin transparent body or coating, through which the rays of the sun may readily pass. The wire mesh will also serve to protect the slip from harm, as for example, from being stepped upon or blown over.

Other objects will appear as the description proceeds.

In the accompanying drawings which form a part of our application,

Like characters of reference are used throughout the following specification and the accompanying drawings to designate corresponding parts.

Figure 1:
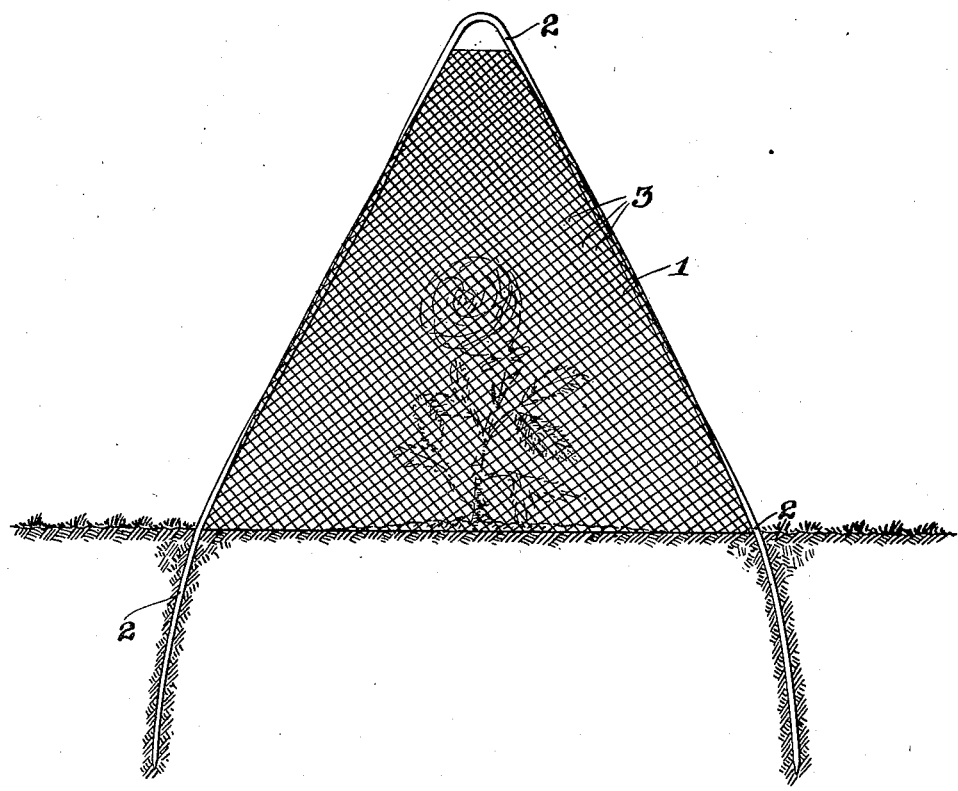
Figure 1 is a side elevation of our improved plant forcing device.
Figure 2:
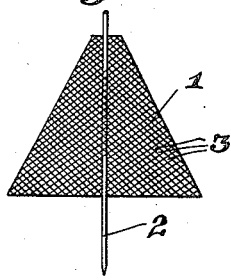
Figure 2 is an end view on a smaller scale of the plant forcing device.
Figure 3:
Figure 3 is a fragmentary enlarged vertical sectional view through the mesh showing the celo glass in position between the interstices thereof.
Figure 4:
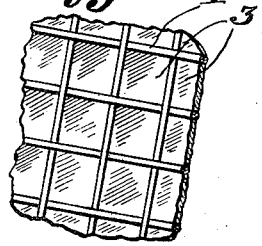
Figure 4 is a fragmentary enlarged side view, partly in section, of a portion of the wire mesh filled with the celo glass.

Our improved invention comprises a cone shaped body 1, which is made of a small piece of wire mesh and is reinforced and held in position by means of the inverted V-shaped anchoring wire 2, which is interlaced through the mesh, and is adapted to have its opposite ends extended down a considerable distance below the bottom of the cone shaped body.

The top of the body 1 is open so that air may get therein to the slip which is being forced. The lower ends of the anchoring wire 2 are adapted to be forced into the ground until the bottom of the cone shaped body engages with the surface of the ground. The lower ends of the anchoring wire are bent slightly inwardly and serve to firmly hold the forcing device in position when the said ends are imbedded in the wire. The main feature of our invention is the fact that the interstices between the mesh are filled with celo glass, as indicated at 3 and permits the sun light to readily pass therethrough to force the slip over which the device is placed.

Another advantage of this particular arrangement is that several of the devices may be readily nested and while they are light in weight and easy to handle they are very durable.

As before mentioned the wire mesh of the body portion will serve to prevent the slip from being injured from any external source, while the celo glass in the interstices of the mesh acts as a hot bed for the slip and quickly and readily forces the same to get a good start, after which the device may be removed.

Many minor changes in detail of construction may be resorted to without departure from the spirit of the invention.

We claim:

1. A plant housing device comprising a reticulated substantially conical frame adapted to surround a plant, and to be positioned on the ground and provided with an opening in its upper end, and a celo glass film filling the interstices of the reticulated frame, an inverted V-shaped anchoring member having its legs interlaced through the reticulated frame and adapted to be embedded in the ground, the celo glass coating serving to bind the legs of the anchoring member to the reticulated frame.

2. A plant housing device comprising a reticulated substantially conical frame adapted to surround a plant and to be positioned on the ground and provided with an opening in its upper end, and a transparent film filling the interstices of the reticulated frame, an inverted V-shaped anchor member having its legs interlaced through the reticulated frame and adapted to be embedded in the ground, the transparent film serving to bind the legs of the anchoring member to the reticulated frame.

In testimony whereof we affix our signatures.

SAMUEL M. MERWARTH.
ALBERT MERWARTH.
SYLVESTER C. MERWARTH.